Figure 1:
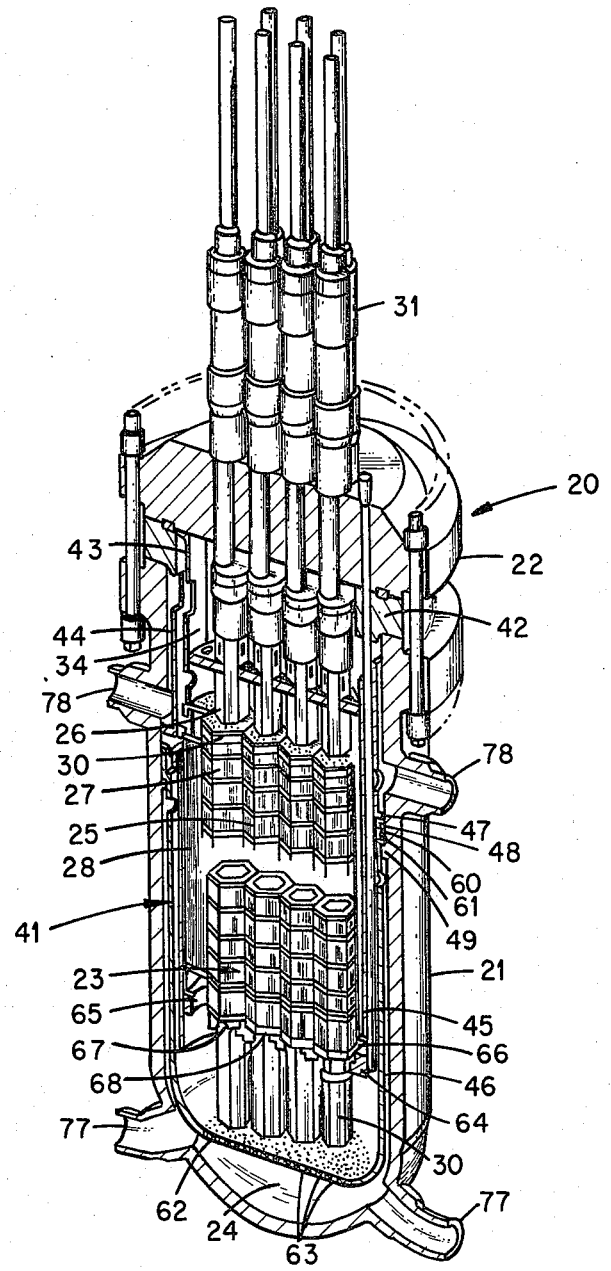
Figure 2:
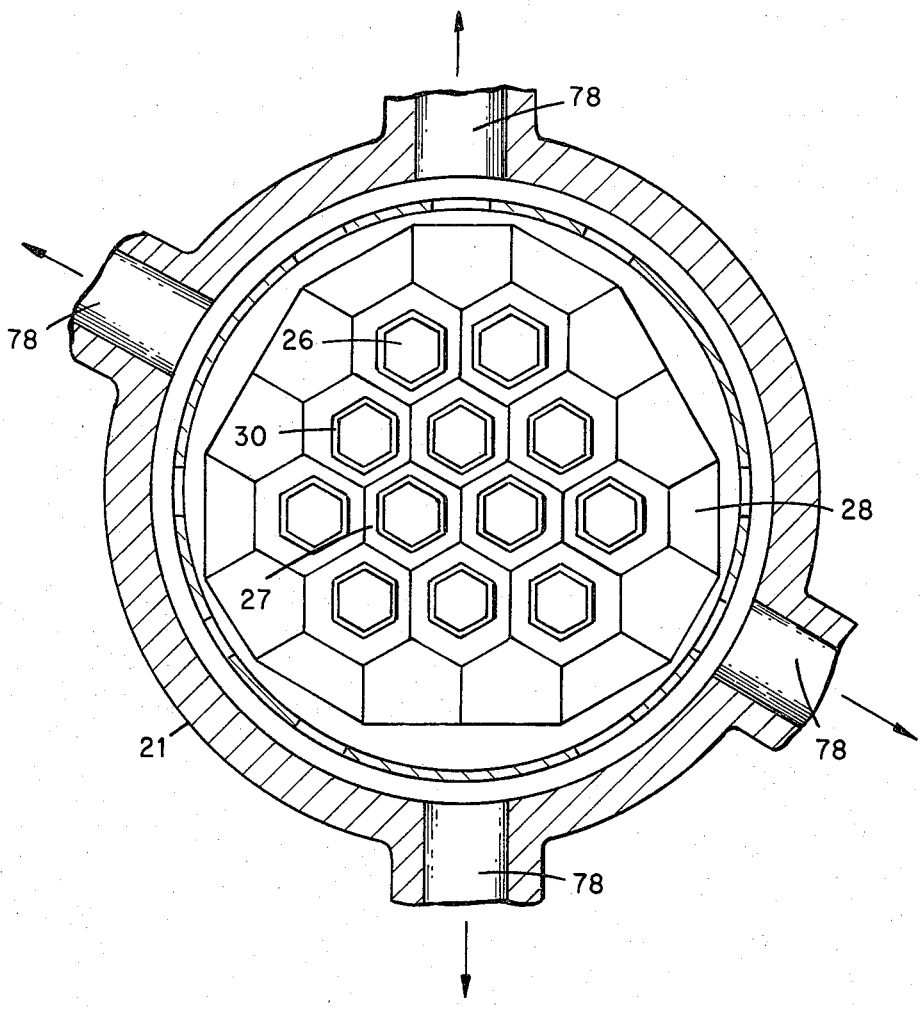
Figure 3:
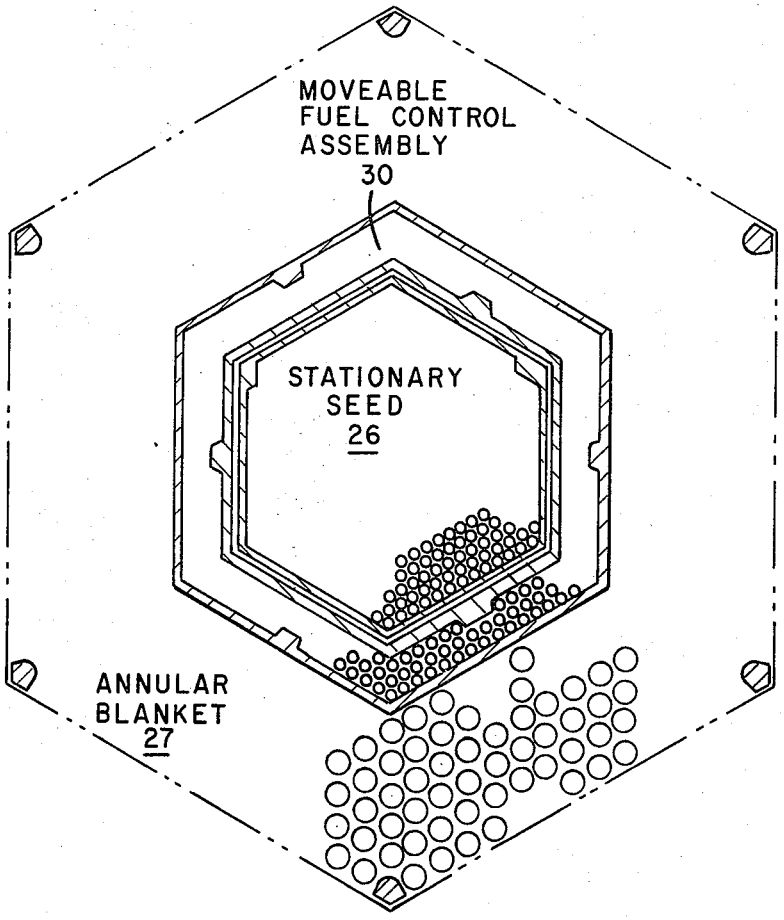
Figures 4A, 4B:
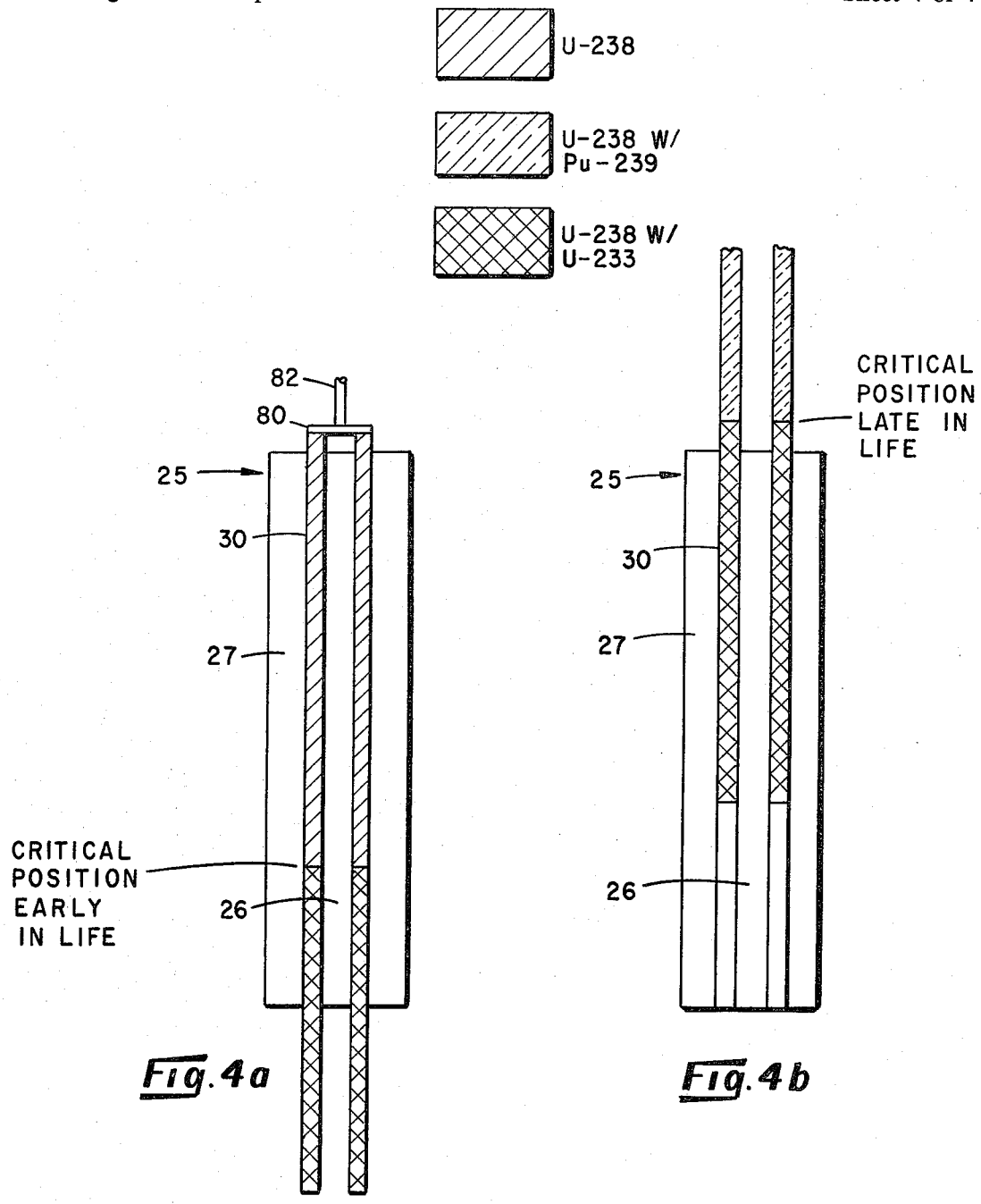

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED JUNE 1, 1976

947 O.G. 14

T947,011
INCREASE IN BREEDING A THERMAL BREEDER REACTOR

Alvin Radkowsky, Tel Aviv, Israel, assignor to the United States of America as represented by the United States Atomic Energy Commission

Continuation of abandoned application Ser. No. 341,449, Mar. 15, 1973. This application Apr. 17, 1975, Ser. No. 568,963

**Int. Cl. G21c *3/28***
U.S. Cl. 176—18
4 Sheets Drawing. 11 Pages Specification

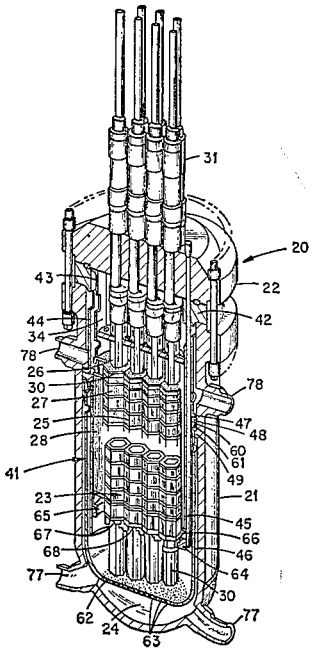

A light water breeder reactor has a plurality of fuel modules and reflector assemblies defining a core. Each of the fuel modules comprises a seed assembly, surrounded by a blanket assembly. The blanket assembly contains uranium-233 fissile fuel and thorium-232 fertile fuel. A reflector assembly contains thorium-232 fertile fuel and surrounds the grouped seed and blanket assemblies. According to the present invention, the fuel modules each additionally comprise an elongated fuel control assembly disposed between the seed assembly and the blanket assembly. The fuel control assembly is disposed for longitudinal movement in relation to the seed and blanket assemblies and is divided into upper and lower fuel regions. Each fuel region has a length approximately equal to the length of the seed and blanket assemblies with the upper fuel region containing essentially uranium-238 and the lower fuel region containing from ninety-five to ninety-nine weight percent uranium-238 and from one to five weight percent uranium-233. The fuel control assemblies are moveable with respect to the seed and blanket assemblies, whereby the upper fuel region is positioned in the reactor core during a first portion of core life until at least one half the converted Pu-239 has on the average a chance to fission or absorb neutrons, and the lower fuel region is positioned in the core during the remainder of core life.

TYPE I MODULE - 3 REQ'D
TYPE II MODULE - 3 REQ'D
TYPE III MODULE - 6 REQ'D
TYPE IV MODULE - 9 REQ'D
TYPE V MODULE - 6 REQ'D